United States Patent [19]
Orino

[11] Patent Number: 5,067,802
[45] Date of Patent: Nov. 26, 1991

[54] LENS MOVEMENT CONTROL DEVICE FOR ZOOM LENS
[75] Inventor: Kanjyo Orino, Kanagawa, Japan
[73] Assignee: Canon Kabushiki Kaisha, Tokyo, Japan
[21] Appl. No.: 598,438
[22] Filed: Oct. 16, 1990
[30] Foreign Application Priority Data
 Oct. 27, 1989 [JP] Japan .................................. 1-281175
[51] Int. Cl.$^5$ ............................................. G02B 15/00
[52] U.S. Cl. .................................. 359/700; 354/400; 359/698; 359/701
[58] Field of Search ....................... 350/429, 430, 423; 354/271.1, 272, 400, 435, 446, 228

[56] References Cited
U.S. PATENT DOCUMENTS 4,054,372 10/1977 Schröeder ........................... 350/429
 4,161,756  7/1979 Thomas ............................... 350/429
 4,740,064  9/1988 Kono et al. ......................... 359/694
 4,957,354  9/1990 Matsuyama ......................... 350/430

Primary Examiner—Loha Ben
Attorney, Agent, or Firm—Fitzpatrick, Cella, Harper & Scinto

[57] ABSTRACT

A zoom lens comprises a varifocal lens section having a variator lens unit for varying the focal length of the entire system and a compensator lens unit for compensating for the image shift with zooming movement of the variator lens unit, a relay lens section using a light beam from the varifocal lens section for forming an object image on a predetermined plane, a lens unit constituting at least part of the relay lens section being made to be an axially movable adjusting lens unit, and a focus adjusting mechanism for axially moving the adjusting lens unit to effect focus adjustment, wherein information about the focus deviation with variation of the focal length by the varifocal lens section is obtained in each focal length position and memorized in a memory, whereby the focus adjustment is carried out in such a way that the predetermined focus deviation information is selected from the memory based on a signal output from a focal length detecting circuit for detecting the zooming position of the varifocal lens section, the amount of movement of the adjusting lens unit is computed by a computing circuit based on the selected focus deviation information and the signal output from an adjusting lens unit detecting circuit for detecting the axial position of the adjusting lens unit, and the adjusting lens unit is moved by a drive device based on a signal output from the computing circuit.

8 Claims, 3 Drawing Sheets

LENS MOVEMENT CONTROL DEVICE FOR ZOOM LENS

BACKGROUND OF THE INVENTION

1. Field of the Invention

This invention relates to a lens movement control device for a zoom lens having focus adjusting means, suited to a photographic camera, video camera, or television camera.

2. Description of the Related Art

It has been the common practice that the zoom lens has, despite variation of the focal length of the entire system by operating its varifocal section, to keep constant the position of an image plane. In more detail, the varifocal section is constructed from a variator lens unit for varying the focal length of the entire system and a compensator lens unit which compensates for the shift of the image plane resulting from the movement of the variator lens unit. Stability of maintenance of the image plane in the constant position against variation of the focal length of the entire system is thus ensured in the prior art.

In general, to do this, the variator lens unit may be moved linearly on the optical axis, but the compensator lens unit needs to move non-linearly on the optical axis. In most of the zoom lenses, such a non-linear axial movement of the compensator lens unit is controlled mechanically, or by using a cylindrical cam mechanism.

The design of the camming slots for moving the variator lens unit and the compensator lens unit is made so to assure lengths their loci of motion give a sharp image on the focal plane in the constant position over the entire zooming range. In fact, in the general case, due to the influence of the tolerances on manufacturing, some focus defects arise with zooming. For example, the refractive index of the medium (glass) of the lens differs from item to item, the lens thickness and the curvature of the lens surface err in machining, and, for the lens barrel, the machining error of the retainer rings and the camming slots change from time to time. For any value of the focal length, therefore, the image of optimum sharpness takes different places (focal plane positions) with different zoom lenses. Such a focal plane deviation due to the manufacturing tolerances is becoming very serious in developing zoom lenses which meet the recent growing demand for a higher zoom ratio, a larger relative aperture and a higher grade imagery.

If this problem is solved by adhering to the conventional type of the operating mechanism for the zoom lens, the production tolerance of each constituent part would have to be made severer, giving an alternative problem that the production cost increases.

In addition, the deficiency of correction of the spherical aberration causes, in many cases, a focal plane deviation whose amount varies with variation of the size of aperture opening.

If this problem is solved by using the conventional method of designing zoom lenses, the spherical aberration would have to be corrected far better than was heretofore possible. This calls for an increase of the number of lens elements, use of expensive materials in some of the lens elements, or taking like measures, giving an alternative problem that the cost of materials increases.

As the related art, there is U.S. Pat. No. 4,740,064 in which the conventional slot type cam ring is not provided and, instead, the mounting and operating mechanism in the barrel gets a complicated structure.

SUMMARY OF THE INVENTION

A first object of the invention is to provide a lens movement control device which permits the conventional cam ring having camming slots to be employed so that the barrel structure is kept relatively simple, yet enables the focus deviation to be well compensated for throughout the zooming range.

And, according to the invention, in a preferred embodiment thereof, the zoom lens is constructed with a varifocal lens section comprising a variator lens unit for varying the focal length of the entire system and a compensator lens unit for compensating for the shift of an image plane with zooming movement of the variator lens unit, and a relay lens section for forming an object image on a predetermined plane with the use of a light beam from the varifocal lens section, wherein at least one lens unit in the relay lens section is made to be an adjusting lens unit which is axially movable to adjust the focus. For the zoom lens having such a focus adjusting means, a lens movement control device is provided with a memory portion for storing information representing a value of focus deviation for every focal length position as determined when it is tested by operating the varifocal lens section. As the zooming position of the varifocal lens section changes, the prescribed focus deviation information is selected based on a signal output from a focal length detecting means. Based on the selected focus deviation information and a signal output from an adjusting lens unit detecting means for detecting the axial position of the adjusting lens unit, a computing means determines a distance the adjusting lens unit is to be moved. Based on the signal output from the computing means, a driving means moves the adjusting lens unit to effect focus adjustment.

Besides this, in the present invention, as the aforesaid zoom lens has an aperture stop, the aforesaid memory portion further stores the values obtained by factoring every value of the size of opening of the aperture stop into determination of the value of focus deviation for every focal length position, whereby the aforesaid computing means makes determination of the required amount of movement of the adjusting lens unit based on the prescribed focus deviation information which has been selected on the basis of the signal output from the aforesaid focal length detecting means and another signal output from an aperture value detecting means for detecting the given value of the size of opening of the aperture stop.

DETAILED DESCRIPTION OF THE PREFERRED EMBODIMENT

Figure 1:
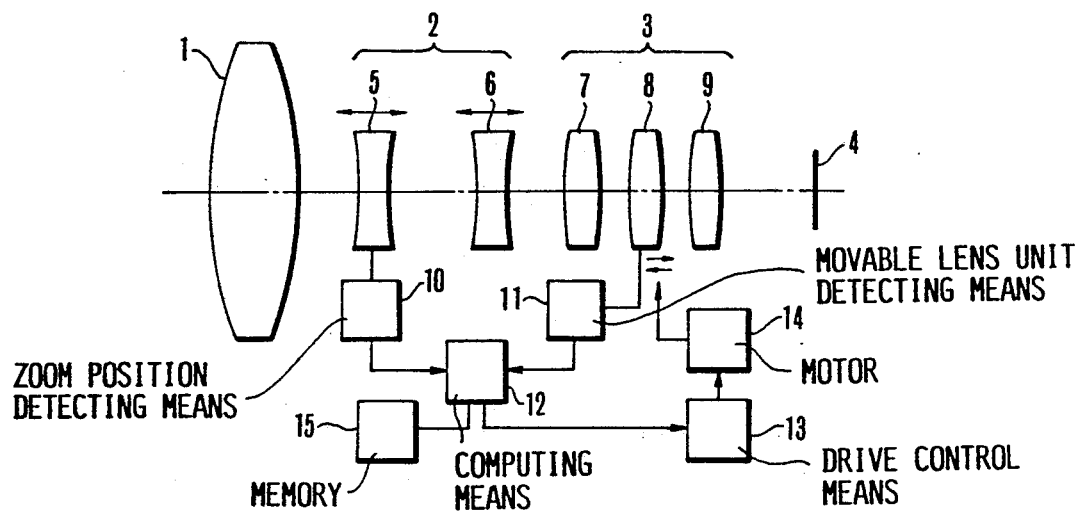
FIG. 1 and FIG. 3 are schematic diagrams of the main parts of first and second embodiments of the invention respectively.

FIG. 1 schematically shows the main parts of the first embodiment of the invention. In the same figure, a focusing lens unit 1 is followed by a varifocal lens section 2 which comprises a variator lens unit 5 for varying the focal length of the entire system with zooming and a compensator lens unit 6 for compensating for the image shift as the focal length is varied by moving the variator lens unit 5. The relation in which these lens units 5 and 6 are moved to effect zooming is determined by the publicly known cam sleeve having camming slots formed therein. And, these camming slots are figured based on the design for the motion loci.

A relay lens section 3, in this embodiment, comprises a relay front unit 7, a relay intermediate unit 8 and a relay rear unit 9. Of these, the relay intermediate unit 8 is a movable lens unit for focus adjustment on axial movement to perform a function to be described later. A predetermined image plane is indicated by reference numeral 4.

The zooming position of the variator lens unit 5 is detected by a zooming position detecting means 10. The axial position of the movable lens unit 8 is detected by a movable lens detecting means 11.

For each item of the zoom lens, the focus deviation due to, for example, the production tolerance, is found in discrete values of the focal length (discrete zooming positions) by means of measurement. The data are stored as the focus deviation information in a memory 15.

A computing means 12 selects the prescribed focus deviation information out of the data in the memory 15 based on a signal output from the zooming position detecting means 10 and, by making reference to a signal output from the movable lens unit detecting means 11, determines by computation the axial position the movable lens unit 8 is to take as the focus deviation should be compensated for. A drive control means 13 is receptive of a signal output from the computing means 12 for driving an electric motor 14. The motor 14 moves the movable lens unit 8 axially by a predetermined distance based on a drive signal output from the drive control means 13.

In the present embodiment, with an item of the zoom lens in an as-assembled state to completion, variation of the focal length is first carried out by moving the variator lens unit 5 and the compensator lens unit 6 along a common optical axis. At this time, whether or not the best focus is maintained in each zooming position is tested by using a focus state detector, though not shown, publicly known. If the best focus is not yet established, the amount of focus deviation (the degree of defocus) $\Delta$ bf is then sought. This work is performed in each zooming position from the wide-angle end W to the telephoto end T. The thus-obtained data of the defocus degree are stored in the memory 15. Here, in the present embodiment, for example, ten points are chosen over the entire zooming range when this work is carried out. The larger this number of points, the more accurately the control can be made, of course. But, because of a limited availability of the memory capacity, so much choice has been made.

Figure 2:
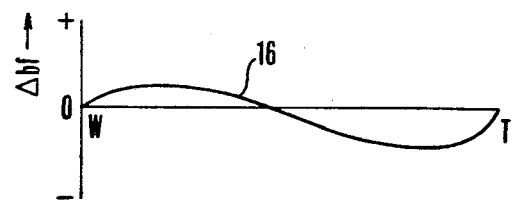
FIG. 2 is a graph for explaining the focus deviation in FIG. 1.

In this connection, it should be explained that, when the movable lens unit 8 initially is so set that no focus deviation occurs in, for example, the wide-angle end W and the telephoto end T, if it would be otherwise made stationary during zooming, the amount of focus deviation $\Delta$ bf changes in other different zooming positions as shown by, for example, a curve 16 in FIG. 2.

Next, the actual practice of photographing will be considered. Suppose the varifocal lens section 2 is zoomed to a certain focal length position. The computing means 12 then computes the signal representing the value of the focal length output from the zooming position detecting means 10, information representing the current position of the movable lens unit 8 output from the movable lens unit detecting means 11 and the selected one of the values of the focus deviation from the memory 15, so as to determine the axial position the movable lens unit 8 must be moved to compensate for the focus deviation, and sends the computation result to the drive control means 13. Based on the signal output from the computing means 12, the drive control means 13 drives the motor 14. The motor 14 rotates, for example, a cylindrical cam relative to the tubular body of the lens barrel, until the movable lens unit 8 reaches that axial position. Thus, the plane of a sharpest image of the zoom lens is brought into coincidence with the predetermined image plane 4.

In the present embodiment, such an operation is ensured over the entire zooming range.

It should be noted that in the present embodiment, it is only required that the movable lens unit is at least a part of the relay lens section. So, the relay front unit 7 or the relay rear unit 9 may be used instead. Also, of the plurality of lens units of the relay lens section 3, two or more lens units in an arbitrary combination may be used for the focus adjusting purpose.

Figure 3:
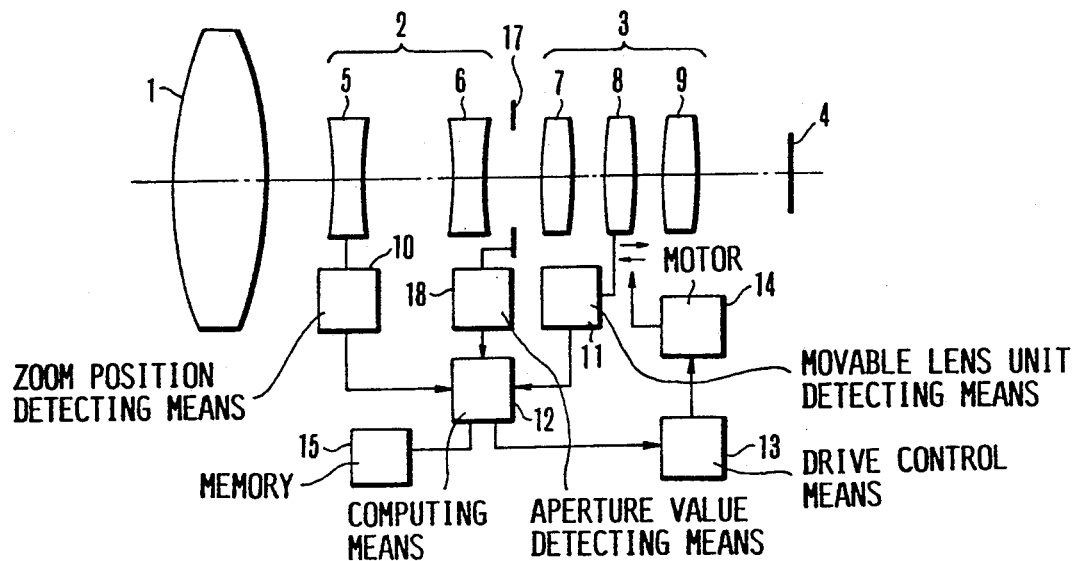

FIG. 3 schematically shows the main parts of the second embodiment of the invention.

In general, the amount of focus deviation resulting from the zooming of the varifocal lens section differs even with different sizes of opening of the diaphragm aperture. On this account, in the present embodiment, unlike the first embodiment of FIG. 1, the aperture value is also taken as an additional factor in compensating for the focus deviation.

Figure 4:
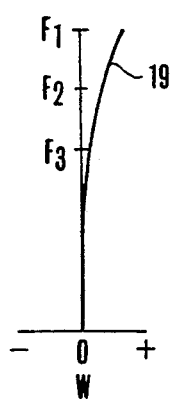
FIG. 4, FIG. 5 and FIG. 6 are graphs for explaining variation of the spherical aberration in different zooming positions of the lens of FIG. 3.
Figure 5:
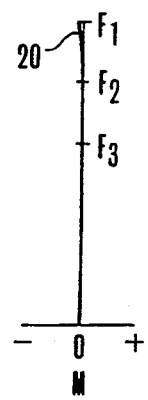
Figure 6:
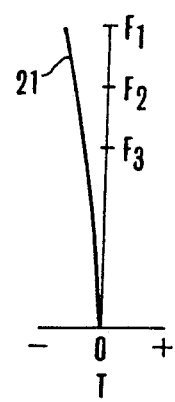
Figure 7:
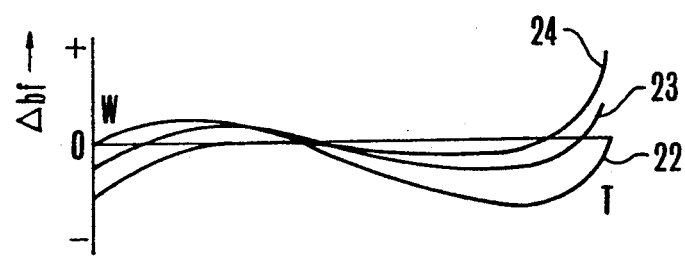
FIG. 7 is a graph for explaining variation of the focus deviation with variation of the aperture value in FIG. 3.

Assuming that the amounts of spherical aberration for the wide-angle end W, the intermediate M and the telephoto end T are different from one another as shown by, for example, line curves 19, 20 and 21 in FIG. 4, FIG. 5 and FIG. 6, respectively. Then, the variation of the position of the plane of best focus (focus position) with zooming of the varifocal lens section takes various different ways depending on the aperture values as shown by curves 22, 23 and 24 in FIG. 7.

So, in the present embodiment, as the aperture size varies to F1, F2, F3 and so on, the data about the amount of focus deviation are previously detected in each zooming position. The combination of these data with those for the zooming positions is made to be memorized in the memory 15.

When actually photographing, the signal output from the zooming position detecting means 10 and a signal output from an aperture value detecting means 18 for detecting the size of aperture opening of a diaphragm 17 are used to select the corresponding one of the predetermined values of focus deviation stored in the memory 15. At the same time, using the signal output from the movable lens unit detecting means 11, the computing means 12 determines the axial position the movable lens unit 8 should take to compensate for that focus deviation.

Then, similarly to the first embodiment of FIG. 1, based on the signal output from the computing means 12, the drive control means 13 drives the motor 14 to axially move the movable lens unit 8, thus compensating for the focus deviation over the entire range of variation of the aperture size.

It is to be noted that in the present embodiment, if the focusing position affects the focus deviation, the movement of the focusing lens unit 1 may be factored into the compensation for the focus deviation.

According to the invention, at least part of the relay lens section, or a lens unit, is made axially movable under the prescribed conditions on the focal length or the aperture size as has been described above. By this, the influences of the machining tolerances and manufacturing errors of the constituent parts and of the spherical aberration on the variation of the focus deviation can be removed to ensure that the latent ability to produce high grade imagery displays itself fully over the entire zooming range. Hence, the invention has achieved an improvement of the optical performance of the zoom lens with the use of novel focus adjusting means.

What is claimed is:

1. A lens movement control device for a zoom lens having variable focal lengths, comprising:
    photographic lens means having first and second lens units axially movable for zooming, and a relay lens unit having a plurality of lens components to form an image with a light beam coming from said first and second lens units;
    drive means for axially moving at least one lens component of said plurality of lens components;
    first detecting means for detecting a focal length;
    second detecting means for detecting the position of said at least one lens component;
    memory means for memorizing information about the movement of said at least one lens component for each focal length; and
    control means for controlling said drive means on the basis of information memorized by said memory means corresponding to the focal length detected by said first detecting means and information about the position detected by said second detecting means.

2. A device according to claim 1, further comprising a cam member having predetermined camming slots for controlling the movement of said first and second lens units.

3. A device according to claim 1, further comprising a diaphragm in cooperation with said photographic lens means and third detecting means for detecting the size of aperture opening of said diaphragm, and wherein said control means controls said drive means further on the basis of information detected by said third detecting means.

4. A device according to claim 1, wherein said photographic lens means further has a lens unit axially movable for focusing in front of said first and second lens units.

5. A lens movement control device for a zoom lens having a variable focal length comprising:
    photographic lens means having first and second lens units axially movable for zooming, and a relay lens unit having a plurality of lens components for forming an image with a light beam coming from said first and second lens units;
    drive means for axially moving at least one lens component of said plurality of lens components;
    a diaphragm;
    first detecting means for detecting the size of aperture opening of said diaphragm;
    second detecting means for detecting the position of said at least one lens component;
    memory means for memorizing information about the movement of said at least one lens component for each size of aperture opening of said diaphragm; and
    control means for controlling said drive means on the basis of information memorized by said memory means corresponding to the size of aperture opening detected by said first detecting means and information about the position detected by said second detecting means.

6. A device according to claim 5, further comprising a cam member having predetermined camming slots for controlling the movement of said first and second lens units.

7. A device according to claim 5, further comprising third detecting means for detecting a focal length, and wherein said control means controls said drive means further on the basis of information detected by said third detecting means.

8. A device according to claim 5, wherein said photographic lens means further has a lens unit axially movable for focusing in front of said first and second lens units.

* * * * *

UNITED STATES PATENT AND TRADEMARK OFFICE
CERTIFICATE OF CORRECTION

PATENT NO. : 5,067,802
DATED : November 26, 1991
INVENTOR(S) : KANJYO ORINO It is certified that error appears in the above-identified patent and that said Letters Patent is hereby corrected as shown below:

On the title page:

<u>In the References Cited</u>

Line [56], "4,740,064 9/1988 Kono et al." should read --4,740,064 4/1988 Kono et al.--.

<u>Column 1</u>

Line 31, "so" should read --so as-- and "lengths" should read --that--.

<u>Column 5</u>

Line 20, "variable focal lengths" should read --a variable focal length--.

Signed and Sealed this

Eighth Day of June, 1993

Attest:

MICHAEL K. KIRK

*Attesting Officer*       Acting Commissioner of Patents and Trademarks

Adverse Decision in Interference

Patent No. 5,067,802, Kanjyo Orino, LENS MOVEMENT CONTROL DEVICE FOR ZOOM LENS, Interference No. 104,184, final judgment adverse to the patentee rendered August 17, 2000, as to claims 1 and 2.

*(Official Gazette January 23, 2001)*